United States Patent [19]

Perry

[11] Patent Number: 5,395,056
[45] Date of Patent: Mar. 7, 1995

[54] ADVANCED FRACTURE BLADE AND METHOD OF OPERATION FOR FLUORESCENT TUBE DIGESTER

[76] Inventor: Timothy J. Perry, 1875 Piedras Cir., Danville, Calif. 94526

[21] Appl. No.: 77,311

[22] Filed: Jun. 15, 1993

Related U.S. Application Data

[63] Continuation of Ser. No. 732,205, Jul. 18, 1991, abandoned.

[51] Int. Cl.⁶ ............................................. B02C 19/12
[52] U.S. Cl. .......................................... 241/19; 241/24; 241/57; 241/60; 241/79; 241/99; 241/100; 241/195; 241/292.1
[58] Field of Search ....................... 241/30, 19, 18, 24, 241/57, 60, 99, 195, 292.1

[56] References Cited

U.S. PATENT DOCUMENTS

| | | |
|---|---|---|
| 578,234 | 3/1897 | Gutenkunst . |
| 737,543 | 8/1903 | Wisner . |
| 1,268,394 | 6/1918 | Shamblen . |
| 1,435,330 | 11/1922 | Pardee . |
| 1,740,439 | 12/1929 | Setzer . |
| 1,793,097 | 2/1931 | Kramer ................................ 241/195 |
| 2,045,690 | 6/1936 | Armstrong ...................... 241/195 X |
| 2,091,772 | 8/1937 | Steele . |
| 2,185,352 | 1/1940 | Peters ................................... 241/99 |
| 2,235,712 | 3/1941 | Lehr . |
| 2,421,014 | 5/1947 | Coss et al. . |
| 2,538,255 | 1/1951 | Lyon ................................... 227/141 |
| 2,593,657 | 4/1952 | Coon et al. ....................... 241/99 X |
| 2,620,988 | 12/1952 | Tellier .............................. 241/99 X |
| 2,628,036 | 2/1953 | Hall .................................. 241/99 X |
| 2,840,127 | 6/1958 | Stokes et al. . |
| 2,866,604 | 12/1958 | Hall .................................. 241/99 X |
| 2,965,321 | 12/1960 | Koontz . |
| 3,132,851 | 5/1964 | Tone et al. . |
| 3,333,777 | 8/1967 | Highfill, Jr et al. .................. 241/47 |
| 3,353,756 | 11/1967 | Morgenson ........................... 241/99 |
| 3,604,489 | 9/1971 | Laszlo . |
| 3,655,138 | 4/1942 | Luscombe ............................. 241/99 |
| 3,697,005 | 10/1972 | Lundin et al. ................... 241/195 X |
| 3,856,218 | 12/1974 | Harmon et al. ................. 241/195 X |
| 3,889,886 | 6/1975 | Spivey ............................. 241/99 X |
| 3,913,849 | 10/1975 | Atanasoff et al. ................ 241/99 X |
| 3,931,841 | 1/1976 | Blum . |
| 3,963,183 | 6/1976 | Paulsen . |
| 4,049,204 | 9/1977 | McKee ......................... 241/292.1 X |
| 4,129,262 | 12/1978 | Lowry ............................. 241/195 X |
| 4,344,581 | 8/1982 | Redemann ..................... 241/195 X |
| 4,545,540 | 10/1985 | Nakamura ............................ 241/99 |
| 4,579,287 | 4/1986 | Brown ............................. 241/99 X |
| 4,607,798 | 8/1986 | Odlin ................................. 241/99 |
| 4,655,404 | 4/1984 | Dekleron ............................ 241/99 |
| 4,786,000 | 11/1988 | Weil et al. ....................... 241/99 X |
| 4,809,915 | 3/1989 | Koffsky et al. .................. 241/99 X |
| 4,819,883 | 4/1989 | Weil et al. ............................ 241/99 |
| 4,871,118 | 10/1989 | Maloney . |
| 5,042,724 | 8/1991 | Perry .............................. 241/99 X |
| 5,092,527 | 3/1992 | Perry et al. ..................... 241/99 X |

FOREIGN PATENT DOCUMENTS

| | | |
|---|---|---|
| 0248198 | 12/1987 | European Pat. Off. . |
| 262066 | 3/1988 | European Pat. Off. .............. 241/99 |
| 2467632 | 4/1981 | France . |
| 3338641 | 5/1985 | Germany . |
| 8703479 | 7/1987 | Germany . |
| 61-219736 | 9/1986 | Japan . |

Primary Examiner—Mark Rosenbaum
Assistant Examiner—Frances Han
Attorney, Agent, or Firm—Charles A. Wilkinson

[57] ABSTRACT

The uniformity and suitability of fractural glass derived from breaking used fluorescent tubes for separation of the glass and potentially toxic powder adhered to the fractured glass prior to disposal and recovery of the components glass and powder is improved by use of a fracture blade having a sharp striking point extending forwardly from a base composed of a flat transversely oriented rotatable striking blade. The blade is preferably, for best results in later separation of the glass particulates and powder, operated at a striking blade speed of 1760 to 3700 feet per minute, providing a uniformity and size of fractured glass upon which a significantly more effective countercurrent air separation can be made.

32 Claims, 2 Drawing Sheets

Fig. 8

ADVANCED FRACTURE BLADE AND METHOD OF OPERATION FOR FLUORESCENT TUBE DIGESTER

This application is a continuation, of application Ser. No. 07/732,205, filed Jul. 18, 1991, now abandoned.

RELATED APPLICATIONS

This application is related to several prior applications filed by the same inventor and particularly to the application entitled "Fluorescent Tube Crusher with Particulate Separation and Recovery", Ser. No. 458,177, Filed Dec. 28, 1989, now U.S. Pat. No. 5,092,527 which disclosed, among other things, a particular type of rotating fracture blade for crushing fluorescent tubes.

BACKGROUND

(1) Field of the Invention.

The present invention relates to the crushing or digesting of used fluorescent tubes. More particularly the present invention relates to an improved rotatable crushing blade and the method of using such blade for the effective crushing of used fluorescent tubes into substantially uniform sized pieces of glass or pieces of glass within a uniform range of sizes prior to separating the glass and various potentially toxic materials contained within the interior of the fluorescent tubes from each other. More particularly, the present invention relates to an improved shape of a fluorescent tube fracturing blade and a range of speeds for operation of such blade which provides the desired results, i.e. the desired separation of the fractured glass particulates and the toxic powder and other substances contained originally within the fluorescent tubes.

(2) Discussion of the Prior Art.

Fluorescent light tubes are formed from elongated, cylindrical or tubular glass receptacles which are charged with mercury or other conductive vapors. The inside surface of the tube is coated with a fluorescent coating of some form such as phosphorus itself or other phosphor powders such as antimony, beryllium, cadmium and strontium compounds plus in some cases, lead and the like. Mercury vapor as well as beryllium, strontium, lead and cadmium are well known as potentially toxic materials as are other phosphor powders with which the inside of the fluorescent tube may be coated. Older fluorescent tubes often use high concentrations of beryllium powders, but this has been in general superseded in more recent fluorescent tubes by cadmium-type powder.

Since fluorescent tubes are, in general, bulky and unsatisfactory for disposal without treatment, it has become customary to crush them into small pieces by various means and then dispose of the fractured pieces. Merely fracturing the tube itself into small pieces for disposal, however, is not very satisfactory because of the potentially toxic nature of the dust and vapor originally confined inside the fluorescent tube. Such potentially toxic particulates, which occur mostly in the form of small dust particles plus mercury vapor and small drops or beads of mercury, can be quite detrimental if they escape to the environment.

In previous applications filed by the present Applicant, methods and means for crushing fluorescent tubes and then separating the fractured glass particulates from the potentially toxic materials contained within the original tube have been disclosed. Such methods and apparatus are based on an air separation effected between the glass particulates and the smaller toxic powders and vapors contained within the original fluorescent tubes. In particular, in accordance with such previous inventions, the fractured fluorescent tube materials are exposed to a rapidly moving body of gas such as stripping air, preferably passing countercurrently with such particulates. In this way the smaller, lighter dust and mercury vapor is carried away to a recovery system while the glass particulates are removed from the system for recycling to glass manufacturers and the like. In order to provide such separation, it is important that the glass particulates not be crushed too small so that they will have sufficient weight such that they will not be carried away by the stripping gas together with the small toxic powder particles.

In Applicant's U.S. application Ser. No. 458,177 filed Dec. 28, 1989 a flat, rapidly rotating blade was disclosed for fracturing fluorescent tubes thrust down a feed chute into the path of the rotating blade. The blade, upon striking the fluorescent tube, fractured such tube into small particles and these were then conveyed by gravity and other means through a system while separating toxic powder from the surfaces both by gravity processes and particularly by countercurrent air flow or gas stripping processes. As indicated above, it is important in crushing the glass that the pieces not be too small such that they may be carried away with countercurrent stripping air, nor should such pieces of glass be too large or they will not only not pack efficiently, but will also not have their surfaces exposed efficiently for transportation through the stripping air for stripping away of the toxic powder normally adhering to the original inside surface of the fluorescent tube. It is highly desirable, therefore, that the glass particles be of fairly uniform size and shape. It is also desirable, since glass is a very hard substance which rapidly wears away even fairly hard steel, for the rotating crushing blade to have a configuration and composition which will be durable and wear-resistant.

It has long been known to provide apparatus for generally breaking or crushing glassware, and particularly glass bottles and the like to reduce their bulk and more recently, it has also been widely suggested that fluorescent tubes be fractured into their constituent pieces for more convenient disposal as well as, in some cases, recovery of the components of the tubes. Among apparatus provided for crushing glass, and, of late, particularly fluorescent tubes, may be mentioned the following:

U.S. Pat. No. 2,185,352 issued Jan. 2, 1940 to C. F. Peters discloses an early type of glass fracturing device for fracturing bottles. The fracturing device in the Peters patent is a pivoted hammer-type arrangement.

U.S. Pat. No. 2,538,255 issued Jun. 26, 1951 to N. E. Johnson et al. discloses a remote control glass breaking machine in which bottles in particular are slid down a tube where they intercept a horizontally rotating motor driven fracturing blade comprised essentially of a rotating backing having slightly curved forward hammer surfaces which rapidly strike the bottle, pulverizing it by repeated blows. The hammer surface shown has a sharp edge on one side and is somewhat like a cleaver blade.

U.S. Pat. No. 2,593,657 issued Apr. 22, 1952 to A. J. Coon et al. discloses a reciprocating-type crusher designed to crush fluorescent tubes and the like. The Coon et al. crusher involves reciprocating two opposed crushing surfaces relatively towards each other with a fluorescent tube between them, said reciprocating surfaces being moved by means of a rotating cam arrangement. There is no rotating fracture blade per se.

U.S. Pat. No. 2,620,988 issued Dec. 9, 1952 to E. H. Telier discloses a fluorescent tube chopping device including a rotating fracture blade or "star shaped breaking wheel" which progressively breaks off the end of a fluorescent tube during the fracturing operation. Each arm of the fracture blade appears to have a substantially flat striking face.

U.S. Pat. No. 2,628,036 issued Feb. 10, 1953 to J. B. Hall discloses a fluorescent lamp disposal arrangement including a rotating hammer-type arrangement for fracturing the fluorescent tubes. The rotating hammers, which are contained in a circular fracture chamber, are pivoted upon the outer circumference of a rotating disk.

U.S. Pat. No. 2,866,604 issued Dec. 30, 1958 to J. B. Hall discloses a fluorescent tube disposal device including a rotating breaker arm.

U.S. Pat. No. 3,333,777 issued Aug. 1, 1967 to C. W. Highfill et al. discloses a grinding mill which, although it is not designed for the fracturing of glass or fluorescent tubes, does disclose a series of flat blades arranged for progressively striking rocks and the like within a grinding chamber and in which fine dust is carried away.

U.S. Pat. No. 3,353,756 issued Nov. 21, 1967 to D. J. Morgenson discloses a horizontally rotating hammer blade, into the path of which glassware such as bottles are dropped. The blade is rotated at a high speed such as 1700 rpm's so that a bottle dropped into the spinning blades may be struck as many as sixty times for each second the bottle remains in the contact zone. The blades of Morgenson are more like chopping blades than impact blades since they strike the bottles on their edge rather than on their flat side.

U.S. Pat. No. 3,655,138 issued Apr. 11, 1972 to G. A. Luscombe discloses a multi-blade bottle or other glassware breaking device. The chopping blades comprise a series of fairly thin blades mounted in a stack, flat against each other to form a composite blade having in effect a number of knife blades sticking out from a central core at various points, which blades upon rotation of the central core strike anything passing by.

U.S. Pat. No. 3,889,886 issued Jun. 17, 1975 to J. D. Spivey discloses a bottle breaking device including a series of edgewise rotating blades journaled on a transverse shaft. There are also a series of transverse stationary blades extending across the chopper and forming a grating between which the rotating blades pass during rotation. In effect, glass material has to be chopped within a size range which will slip down through the grating before it can pass beyond the chopping blades.

U.S. Pat. No. 3,913,849 issued Oct. 21, 1975 to I. M. Atanasoff et al. discloses a fluorescent tube digester or breaker in which the breaking of the fluorescent tubes is accomplished by a double bladed knife rotating horizontally next to the tube inlet.

U.S. Pat. No. 4,545,540 issued Oct. 8, 1985 to A. Nakamura discloses a fluorescent tube breaking device in which the tubes are broken by rotating fracture blades which rotate edgewise on a shaft in cooperation with a number of other blades and catch the fluorescent tube against a series of stationary blades mounted effectively between the rotating blades. The arrangement is substantially similar to the Spivey patent cited above.

U.S. Pat. No. 4,579,287 issued Apr. 1, 1986 to W. E. Brown discloses a fluorescent tube fracturing device including a pair or plurality of flailing chains attached to a rotating disk. Both the disk and the chains rotate horizontally and intercept a vertically inserted fluorescent tube.

U.S. Pat. No. 4,607,798 issued Aug. 26, 1986 to K. F. Odlin discloses a lamp crushing apparatus having a special allegedly non-jamming crushing blade which takes the form of a plurality of surface compartments in a drum section into which compartments or pockets formed between vanes at the surface of the drum the lamps are inserted, crushing said lamps into more or less equal, discrete quantities of fractured glass.

U.S. Pat. No. 4,655,404 issued Apr. 7, 1987 to J. W. Deklerow discloses a fluorescent tub chopping apparatus in which the tubes are inserted into the path of a rotating chopping means formed from a pair of flails comprised of rectangularly shaped bars secured to a central rotating plate by hooks. The tube to be fractured is inserted past the horizontally rotating flails.

U.S. Pat. No. 4,786,000 issued Nov. 22, 1988 to E. P. Weil et al. discloses a bottle breaking apparatus comprising a pneumatic ram with a central punch and a following plate which fractures the bottle against a V-shaped supporting wall. It is said the device does not form as many small particles of glass which may be difficult to recycle. The plate is deliberately not completely advanced against the bottle to avoid crushing said bottle into small pieces.

U.S. Pat. No. 4,819,883 issued Apr. 11, 1989 to E. P. Weil et al. uses the same pneumatic punch and following plate to crush glass bottles as the prior Weil patent and in addition provides an angular support wall in the rear that does not support the bottle in the center and increases its shattering.

While the above devices have generally been effective to fracture fluorescent tubes as well as other glass materials and other compositions of materials into small pieces, such blades generally have not been effective to provide a uniform fracturing of the tubes.

THE RELATED INVENTION IMPROVED UPON

The two prior filed and concurrently pending applications of the present inventor and a co-inventor entitled "Fluorescent Tube Crusher with Particulate Separation and Recovery" and "Improved Fluorescent Tube Crusher with Particulate Separation and Method" describe a fluorescent tube apparatus that provides superior separation and recovery of toxic powders coating the interior of fluorescent tubes from fractured glass particulates comprised of particles of the broken or crushed glass envelope of the tube. Metallic vapors from the tube, mostly comprising mercury, are also efficiently separated either for safe disposal or for recovery and recycling. Such superior separation and recovery is accomplished by fracturing the fluorescent tubes in a fracturing chamber through which a rapid stream of gas or air is drawn and then exposing the fractured pieces of glass to a very rapid countercurrent flow of a stripping gas which strips from the surface of the glass particulates any loose powder still adhering to the glass. The flows of gas through the fracturing chamber and through the countercurrent stripping chamber are then combined and directed to a filtering system comprising an initial centrifugal separator followed by several fine filters and a final activated carbon metallic absorption system. The fracture blades shown, particularly in the application entitled "Fluorescent Tube Crusher with Particulate Separation and Recovery" have essentially either a flat blade bent at right angles on the ends to form substantially flat or, alternately even slightly angled impact surfaces which impact the side of the fluorescent tube, progressively breaking the tube as the tube advances into the rotating blade. A related blade has been made of a central rotating hub on the surface of which, usually at opposed points, are two flat blades which again strike the fluorescent tubes as they are advanced into the blade. While the blades thus disclosed have been found to be quite effective in fracturing a fluorescent tube into small pieces, they have been subject to severe wear and the sizes of the pieces of glass derived from the chopping action have not always been uniform in size. In particular, there have tended to be fairly large glass pieces and then a number of intermediate sized pieces of glass and also some fairly small pieces which, as explained above, may cause difficulty in final separation from the potentially toxic powder materials within the fluorescent tubes. Equally important, these prior blades have tended to frequently damage the electrical tips upon the ends of the fluorescent tubes and sometimes to mangle them and to not make a clean separation of the glass of the tube from such electrical tips. There has been a need, therefore, for the development of an improved fracture blade which will largely fracture the fluorescent tube into uniform size fractured particulates with a minimum of small powder pieces which may be entrained in the countercurrent stripping gas and be removed with the toxic powder material. There has also been a need for a fracture blade that will not significantly damage the electrical tips and will cleanly break the glass away from such tips.

OBJECTS OF THE INVENTION

It is an object of the present invention, therefore, to provide a fluorescent tube fracture blade which will be effective to fracture fluorescent tubes into uniform sized glass particulates.

It is a further object of the invention to provide a fluorescent tube fracture blade which will be durable and wear resistant.

It is a still further object of the invention to provide a fracture blade for fluorescent tube crushing having a particular blade shape which is effective in crushing the glass of the tubes into a uniform size and also preventing undue wear of the crushing blade.

It is a still further object of the invention to provide a method of operating a crushing blade in accordance with the present invention which provides a uniform size of glass particulates from the crushing operation.

It is a still further object of the invention to provide a speed of operation of a crushing blade which is critically effective to provide glass pieces within a desirable range for treatment in a countercurrent gas separation process.

It is a still further object of the invention to provide a fracture blade configuration and speed of operation for such fracture blade which will provide uniform sized glass particulates from a fluorescent tube fracturing operation.

It is a still further object of the invention to provide a fluorescent tube fracture blade designed for rotation upon a hub and provided with an extended nose designed to strike a fluorescent tube in the center initially fracturing said tube plus flat sections of the blade which then strike the sides of the tube, resulting in a superior uniform provision of fractured glass pieces from such fracturing operation.

It is a still further object of the invention to provide a fluorescent tube fracture blade that will not significantly damage the electrical tips upon the ends of fluorescent tubes and that will cleanly remove the glass of such electrical tips.

It is a still further object of the invention to provide a fracture blade that will efficiently and cleanly separate electrical tips from the glass envelope of a fluorescent tube.

Other objects and advantages of the invention will become evident from reference and accompanying drawings and description hereinafter.

BRIEF DESCRIPTION OF THE INVENTION

In accordance with the invention, an improved fracture blade or crushing blade is provided for use in the fracturing or crushing of fluorescent light tubes during the digestion of such tubes for disposal and/or recovery or recycling of the components. A method of operation of the blade is also provided which provides superior results over that which have previously been attained. The new fluorescent tube fracture blade has a basically flat striking face similar to prior blades which have been used, but is additionally provided with a substantially sharp point upon each striking face usually preferably near the end of such striking face and positioned in a central position so that the sharp point is the first portion of the blade to strike the tube and strikes upon substantially the upper circumference of the tube at the highest point. The striking blade is also preferably hard faced by any suitable processes which will provide a wear-resistant surface such as a chromium-nickel surface upon the blade, particularly along the sides where the blade strikes the sides of the fluorescent tube. The striking point is also preferably formed of either a hard-faced material or a wear-resistant material per se. The striking or fracture blade is also preferably demountable or replaceable so that a new blade can be easily and conveniently removed and replaced by another blade when worn out. It has been found that the best operation of the crusher blade of the invention is at a tip speed of between 3700 feet per minute and 1760 feet per minute with the best speed or velocity being about 2725 feet per minute or most preferably about 2650 to 2800 feet per minute and somewhat less preferably about 2400 to 3050 feet per minute.

DESCRIPTION OF THE PREFERRED EMBODIMENTS

The present invention provides an improved fracture blade and method of using for fracturing used fluorescent light tubes. The invention is used in connection with previously invented apparatus shown and described in prior applications of the Applicant. The new blade essentially incorporates a pointed tip on an otherwise flat blade which serves to initially fracture the outside or front of the tube causing the glass to separate away from the tips and then fracture the sides of the tube to be differentially fractured. A much more uniform glass breakage is obtained and the metal tip of the tube is much less severely damaged so the entire operation is improved. The speed of the blade is also controlled within the predetermined limits in accordance with the invention leading to a much improved operation due to more uniform fractured glass size so that the separation from the toxic powder is improved.

The following description of the invention first describes the type fracture blade previously used by the present applicant, which in itself was an improvement over prior practice and then describes the blade and its operation as part of the invention, followed by a full description of the use of the new blade in the Applicant's presently preferred overall apparatus for digesting used fluorescent tubes for recycling and/or disposal.

Figures 1, 2, 3, 4, 5, 6, 7:
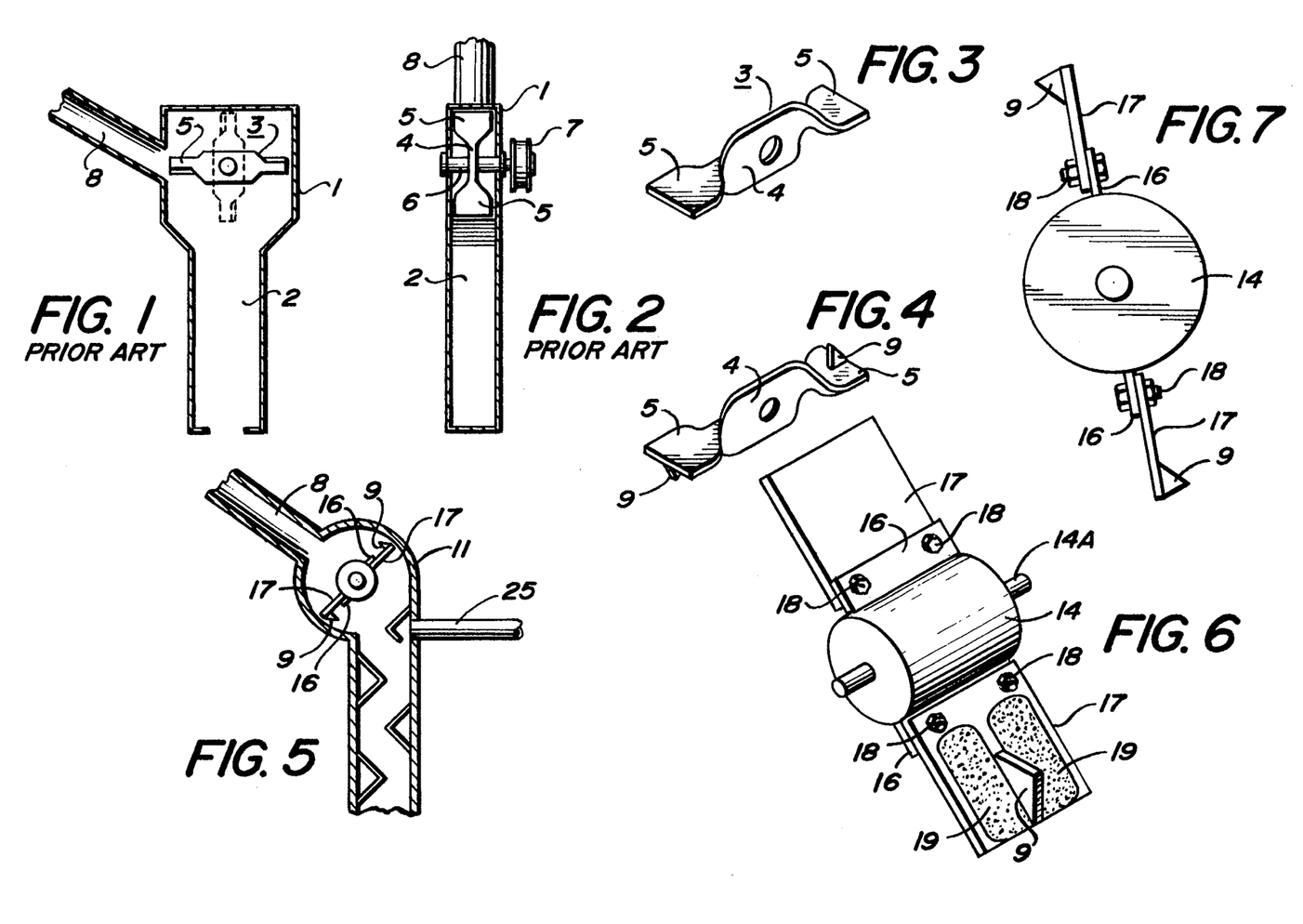
FIG. 1 is a schematic side view of an earlier prior art fracture blade mounted for rotation in an earlier type of fracture chamber.
FIG. 2 is an end view of the prior art fracture or crusher blade and chamber shown in FIG. 1.
FIG. 3 is an isometric view of the prior art crusher or fracture blade shown in FIGS. 1 and 2.
FIG. 4 is an isometric view of one embodiment of the crusher blade of the invention incorporating the sharp fracture tips of the invention.
FIG. 5 is a schematic side elevation of a preferred embodiment of the fracture blade of the invention mounted in a preferred crusher or fracture chamber.
FIG. 6 is an enlarged isometric view of the preferred fracture blade of the invention shown in FIG. 5.
FIG. 7 is an enlarged side elevation of the preferred fracture blade of the invention shown in FIGS. 5 and 6.

FIGS. 1 and 2 diagrammatically depict respectively, a side view and an end view of an earlier embodiment of a fracture chamber and countercurrent stripping chamber 2 used for mounting a rotatable tube fracturing blade 3. The fracture blade 3, which has a flat central portion 4 aligned with the rotation of the blade and two tube fracturing striking blade section 5 arranged at substantially right angles to the central blade sections, is mounted upon a rotatable shaft 6 operable by means of a pulley 7. The flat central section 4 of the blade 3 provides an air flow path through the chopping or fracture chamber at all positions of the blade while the blade sections 5 substantially fill the outer sections of the fracture chamber 1 as they revolve. As will be understood, used fluorescent tubes are inserted or thrust down the inlet tube 8 until struck by the rotating blade 3 which shatters the tubes, progressively breaking off pieces of such tubes, which pieces fall into the countercurrent stripping chamber 2, where, as explained in prior applications, the fractured pieces of glass are stripped, or partially stripped, of potentially toxic phosphor powders adhering to such glass particulates.

While the previous fracture blade was quite effective when combined with the remainder of Applicant's apparatus as disclosed in prior applications and described further in FIGS. 5 and 8 hereinafter described, such blade it was discovered had certain draw backs, including a tendency to damage the tips of the tubes rather severely, a tendency not to make a clean separation of the glass from the tips, a tendency to produce fractured glass of various miscellaneous sizes and a severe tendency to premature failure through wear as well as providing an excessive amount of fine metal powder in the phosphor powder recovered due to such severe wear.

FIG. 3 is an isometric view of the fracture blade shown in FIGS. 1 and 2 in larger scale to clearly depict the central flat portion and the flat ninety degree rotated fracture sections 5 at the ends.

The Applicant has now found after extensive study of the problem, that the new blade shown in FIGS. 6 and 7 in large scale and in smaller scale in FIGS. 5 and 8 described hereinafter considerably relieves the previous enumerated problems as well as having other advantages. In addition, it has been found that the principal changes of the invention made to other types of blades can considerably improve their operation and results.

FIG. 4 shows an isometric view of a fracture blade basically similar to the prior blades shown in FIGS. 1, 2 and 3 incorporating, however, the principal improvement of the present invention, namely the provision of a pointed forwardly extending blade 9 referred to here as the "tip separator" mounted at the edge of the center of the flat blades 5. Normally such pointed tip separator 9 will be welded to the face of the flat blades 5. However, it will be understood that it might also be made integral with the blade or be otherwise mounted upon the blade. When the blade 3 is rotated with the tip separator blade mounted upon the end in the central position as shown, as the blade descends upon the fluorescent tube, it will initially strike the center of the bottom of the tube or in some, or indeed most cases, the metal tip. If it strikes the metal tip, little damage is usually done to the tip and the force merely shears off or begins to shear off the tip. A clean separation of glass from the tip is achieved overall. If the tip, however, is not struck, the glass will be struck immediately below the tip shattering the upper side of the tube so that the side or top is caved in, usually forming a pair of fractured pieces of glass extending from the sharp tip entrance to near the side of the tube. The glass at the sides of the tube is, however, temporarily left in tact until the flat side portions of the blade strikes such sections. The side sections are then struck backward and fractured into small pieces usually more or less equal to the initially fractured-out pieces on the front or upper portion of the tube first struck. During this period, the back of the tube tends to fracture in a broadly similar manner.

It will be noted that the striking tip or tip separator 9 shown in FIG. 6 is larger and the blades 17 are inherently longer than the tips 9 shown in FIG. 7 where the rotor 14 is relatively smaller than the broadly corresponding rotor 14 shown in FIG. 7. This is merely to illustrate that the relative dimensions of sharp tip 9 are not critical. The important factor rather is that the sharp point be positioned in the center of the blade and that it be moved or rotated at a linear or circumferential speed of between about 1760 feet per minute to 3700 feet per minute, which is the striking speed of the sharp point and the side of the fluorescent tube fracturing such tube and tending to break it into equal sized pieces.

The blades 17 as shown in FIGS. 6 and 7 are replaceable blades fastened by screw- or bolt-type fastenings 18 to stub blade 16 welded directly to a central rotatable drum 14 which has stub shafts 14a welded or otherwise secured on both ends for mounting in a fracture chamber 11 as shown in FIGS. 5.

It has been found that as the drum 14 rotates carrying the blades 17 about the fracture chamber, the sharp striking point 9 first contacts the electrical tip or a portion of the glass tube of the fluorescent tube frequently shattering the glass at the base of the tip and separating the tip plus progressively fracturing the glass behind the tip.

The speed of the blades 17 within the fracture chamber 17 is approximately 1760 to 3700 feet per minute or more preferably 2400 to 3050, or even more preferably 2650 to 2800 feet per minute. At this striking speed, the tip of the blade upon striking the glass portion of the fluorescent tube causes the glass at the front of the tube to collapse, usually into two more or less equal sized glass sections of about one-quarter-inch in dimension. These sections of glass in effect fold back into the tube as the tip progresses and may be further struck and propelled against the back of the tube where they eventually strike the rear of the glass envelope. Meanwhile, the flat surface of the striking blade 17 continues toward the fluorescent tube and eventually strikes the two sides of the tube which have not immediately broken out. The sides of the tube being presented to the blade in an edgewise orientation rather than with a side orientation, present a stronger, less easily fractured section to the advancing blade. The two side sections, of the tube, therefore, present a considerably greater resistance to the blade and in fact it is the sides of the blade which wear away or abrade the quickest. For this reason, it is preferable for the sides of the fracture blade to be hard faced by an overlay of hard facing material such as tungsten-chrome, chrome manganese and chrome vanadium ferrous hard facing applied by a welding torch or the like. Alternatively, the sides of the blade can have hard metal inserts secured over an underlying common steel base or the sides of the blade can be formed from the separate wear resistant sections of blade material. Since the wear upon the blade is quite uneven due to the configuration of the tube section, it usually is not necessary or desirable to form the entire blade from a hard wear-resistant material. It may in some cases, however, be advantageous to hard face the end or edges of the tip point as well.

As the flat blade 17 strikes the side of the fluorescent tube, the sides are in effect, folded upon each other and usually end up in pieces more or less equivalent to the size of the pieces broken out of the front of the tube. As the striking or fracture blade 17 continues to turn the striking point 17 again strikes the back of the glass tube from which the sides have been broken away. Striking the rear of the tube with the sharp striking point breaks the glass in the center and it tends to fold backward along the sides of the point similar to the action at the front of the tube. The result is that the glass originally broken from the tube is more uniform in size and in particular less very small pieces of glass tend to be formed by uneven fracturing which small pieces may tend to be carried away entrained in the countercurrent stripping gas with the small potentially toxic phosphor and other powders clinging to the glass which it is the aim of the overall process to separate from the glass.

Since the striking blade is traveling at a rather rapid velocity of 1760 to 3700 feet per minute or in the usual sized blade about 850 revolutions per minute and the glass also strikes the sides of the fracture chamber, the primary broken pieces of glass are usually refractured into somewhat smaller sized pieces of about the size of a small fingernail or less before they leave the fracture chamber. However, it has been found that with the striking or fracture blade of the invention, the uniformity of the final glass fragments is much better and the percentage of small particles that might be carried away with the stripping air is much less.

The average size of the glass particles formed, as distinguished from the uniformity of the size, has been found to be principally a function of the speed of the fracture blade. The preferred speed for operation of the following separation process has been found to be approximately 2650 to 2800 feet per minute or less preferably about 2400 to 3050 feet per minute. In general, the operation of the process when using the blade of the invention will be found to be unsatisfactory at tip speeds of less than 1760 feet per minute or more than 3700 feet per minute.

The fracture blade of the invention is, as explained above, used in a process and apparatus for fracturing fluorescent tubes and separating the phosphor particles and mercury vapors from the fractured glass.

Figure 8:
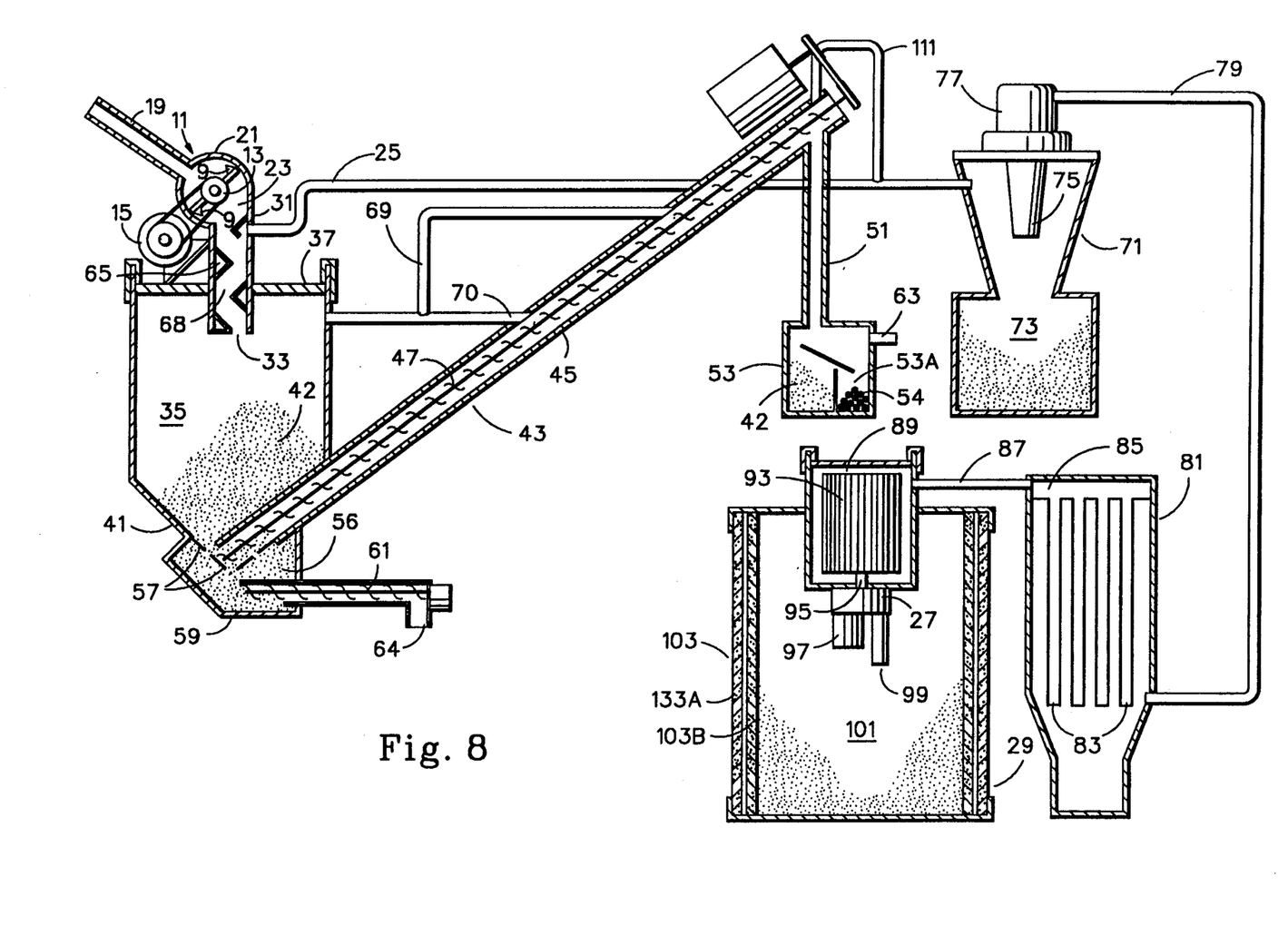
FIG. 8 is a schematic partially broken away side elevation of a preferred arrangement of apparatus in which the fracture blade of the invention may be used.

FIG. 8 shows diagrammatically a side elevation of a partially broken away depiction of the fluorescent tube treatment apparatus of the invention in which it is preferred to use the fracture blade of the invention. An initial fracturing and separating device or means 11 is provided with a rotating blade 13 powered by a motor 15. The rotating blade which is provided with the striking points 9 of the invention is positioned to rapidly strike the end of a fluorescent tube, not shown, that is extended or passed progressively down a feed chute 19. The rotating blade 13 is preferably rotated, as shown in FIG. 1, counterclockwise so that the tube or glass envelope 17 is struck downwardly, progressively breaking off small chunks of the tube which at the same time shatter into individual pieces of glass in the manner explained above. These individual pieces of glass are thrown against the side of the chamber. The shock of both the initial fracturing and the later impact with the walls 21 of the fracture chamber 23, i.e. the upper portion containing the fracture blade 13 of the fracturing and separation device 11, causes the dust particulates coating the inside of the glass envelope to be jarred loose from the surface. These small dust particulates, which are normally adhered to the inside of the fluorescent tube by a suitable thin film of adhesive or other suitable expedients, after jarring loose become entrained in the air stream within the chamber, which air stream or flow passes initially down the feed chute 19 alongside the fluorescent tubes into such chamber and progresses through the fracture chamber 23 to the exhaust conduit or tube 25 which opens into the fracturing and separating device 11 just below the fracture chamber 23. A vacuum or suction is applied to the exhaust tube 25 from a suction or draft device farther down the line, in this case through a suction fan 27, as shown at the right side of FIG. 8, which fan 27 discharges air drawn through such fan with a forced draft directly into a massive activated carbon or charcoal-type filter 29 also shown in FIG. 8. Alternatively, the fan 27 could be positioned beyond the charcoal filter, particularly if it is desired to minimize escape of internal gas through any leaks in the charcoal filter housing or the like.

Below the fracturing chamber 23 of the fracturing and separating device 11 is positioned a countercurrent flow chamber 31 having a decreased diameter lower end through which air is sucked upwardly from the terminal opening 33 from a particulate collection chamber 35 which may comprise a steel hopper-type collector or any other type collector. A top or lid 37 closes off the upper portion of the hopper-type collector and in the embodiment shown also supports the fracturing and separating device 11 or means through the side walls 39 of the countercurrent flow chamber 31.

Within the countercurrent flow chamber 31 in FIG. 8, there are provided a series of baffles or jarring surfaces 65 shown extended from the side wall of the countercurrent flow chamber 31. These baffles 65 are provided with generally upwardly directed slanted impact surfaces onto which the glass particulates drop or are initially projected by the rotating blades 13 and then bounce from the first to the second of such surfaces. A tortuous passage extends down between the baffles 65 for downward passage of the glass particulates and upward passage of a stripping gas. Each impact of a fractured glass particulate with the impact surfaces of the baffles 65 has been found to dislodge additional powder and any other contaminants from the surfaces of the fractured glass particulates and to significantly increase the separation between the glass and the toxic powder particles. Between impact surfaces, the glass particulates pass downwardly through the countercurrent flow of stripping gas which removes dislodged toxic particles and other particulates from the immediate vicinity of the glass particulates and carries them upwardly into the suction or outlet tube 25.

The fractured or broken glass particulates, after being fractured in the fracture chamber 23, fall through the countercurrent flow chamber 31 and through the terminal orifice 33 into the collection chamber 35. During their passage, essentially in a free fall straight downwardly through the countercurrent flow chamber 31, they are acted upon by upwardly flowing gases or air passing through the terminal orifice 33 from the collection chamber 35 into and through the countercurrent flow chamber 31 and into the vacuum or suction conduit 25. As these upwardly moving gases pass the downwardly falling glass particulates, passing through the countercurrent flow chamber, they strip residual toxic dust precipitates from the surface of the glass particulates and carry them upwardly to the inlet of the suction tube 25 through which such powders and gases are exhausted to subsequent filter apparatus to be described. The velocity of the upwardly flowing gas through the countercurrent flow chamber 31 may desirably be about 7200 feet per minute. Less desirably, the gas velocity may be about 6000 to 9000 feet per minute. In all cases, the velocity of the gas passing upwardly through the countercurrent flow chamber 31 should be sufficient to strip away any loose powder adhering to the glass particulates and carry it upwardly to and out the exhaust conduit 25, but insufficient to carry upwardly any significant quantity of glass particulates.

As will be understood, the glass particulates are, in the embodiment of the invention shown in FIG. 1, interrupted in their fall through the countercurrent flow chamber by impacting upon the impact surfaces of the baffles 65. The first such interruption is at the top of the countercurrent flow chamber 31 just after the glass particulates exit from the fracture chamber 23. At this point, many of the particulates are still traveling with residual velocity obtained from impact with the fracture blade 13. The second interruption is just below the first impact surface after the particulates are deflected to the next impact surface and the fourth and last interruption is at the bottom of the countercurrent chamber where the glass particulates strike the last baffle 65 just prior to leaving the tortuous passage 68 via the exit orifice 33 after having bounced from one impact surface to the next, down through the countercurrent stripping chamber. Impact of the glass particulates with the impact surfaces of the baffles 65 leads to vibration of the glass particulates and this vibration, as well as the original shock of impact, tends to crack off or loosen powder from the surfaces of such particulates, which powder is then stripped from the surface by the rapid countercurrent flow air stream.

It will be seen in FIG. 8 that the descending gas or air passing through the fracturing chamber 23, the passage of which gas is substantially aided by the counterclockwise rotation of the fracture blade 13, meets the upwardly passing gas or air flowing through the countercurrent flow chamber at the outlet to the suction conduit 25 and both air or gas streams there merge and pass into the conduit 25.

As will be seen from the drawing in FIG. 8, it is physically impossible for the glass particulates to progress in a straight line through the passage 68 so that the glass particulates must, in effect, drop from one surface to the next, each time jarring and shaking the particulates and causing dislodgment of toxic powder from the surface of the glass particulates. The distance of the jarring surfaces from each other should be sufficient to allow sufficient acceleration of the glass particulates as they fall from jarring surface to jarring surface to dislodge powder from the surface of the glass particulates, but insufficient to cause additional fracturing of the glass. It is undesirable for the glass particulates to be broken into too small particles else they may also be entrained in the countercurrent gas stream and removed with the toxic powder rather than with the larger glass particulates. As indicated above the fracture blade of the invention considerably advances such aim.

The fractured glass particulates, after having passed through the tortuous passage 68 pass through the opening 33 at the bottom of the tortuous passage and fall into the particulate collection chamber 35. Such particulate collection chamber 35 has a substantially conical or slanted bottom 41 against which the fractured glass particulates 42 collect. Extending into such bottom from one side at an angle is an auger-type screw conveyor or mixer 43 having an outer casing 45 and an inner auger 47. The casing 45 is open at the bottom and the auger extends partially from such casing into the mound of fractured glass particulates that has collected upon the bottom 41 of the collection chamber 35. As the auger or spiral screw conveyor turns, the fractured glass particulates are drawn into the spiral conveyor, and as the conveyor rotates, such particulates are carried upwardly in the conveyor. Since the auger is continuously turning and forcing the fractured particulates upwardly, there is a considerable continuous agitation of the particulates with a continuous overturning of the particulates collected within each spiral of the auger with the result that the various particulates are rubbed continuously against each other abrading toxic powder on the original surfaces from such surfaces. Such loosened or freed toxic powder particulates being considerably smaller than the fractured glass particulates tend, due to the general agitation of the column of glass particulates in the auger, to work their way back down the auger while the glass particulates are carried upwardly and discharged at the top down the discharge chute 51 into a collection chamber 53 where the glass particulates may pass through a screen or more preferably, a grizzly 55 which separates out the larger tips or metal electrodes from the ends of the tubes which electrodes are deposited in the separate section 53A of the collection chamber.

The toxic powder material 56, which works its way back down the rotary auger, collects at the bottom and may be allowed to pass through small openings 57, too small for the passage of fractured glass particulates, in the bottom into a storage chamber 59 below the collection chamber 35. A helical screw-type transporter 61 extends into the storage chamber and may be used to remove the toxic powder for disposal or recovery. Such removal may be either continuous or periodic as necessary.

Alternatively, it has been found that since not a great deal of toxic powder collects at the bottom of the rotary screw auger 47, that such powder may merely be allowed to build up or collect at the bottom of the auger 47 and may be merely cleaned out at during down time of the apparatus by a vacuum hose or even manual shoveling through a trap or opening in the side of the bottom of the collection chamber 35 or bottom of the auger casing 45.

While a large percentage of the toxic powder, because of its small size, works its way back down the helical screw conveyor 47 because of its relatively small size and reaches storage chamber 59, some of the toxic powder is also carried up the auger 43 with the fractured glass particulates and is discharged down discharge chute 51 with the fractured glass particulates. This toxic powder, after having passed through the abrasion device, i.e. the rotary auger 43, will have been largely abraded, however, from the surface of the fractured glass particulates.

As a result of an air inlet 63 in the side of the collection chamber 53 and interconnections 70 and 69 between the upper portions of the auger 43 and the particulate collection chamber 35, as well as a separate air or gas take-off conduit 111 at the top of the auger 43 connecting with the main stripping gas conduit 25, air is drawn rapidly up the discharge chute 51 countercurrent with the descending fractured glass material and small particles of toxic powder which, as a result of abrasion between the fractured glass particulates, have all been effectively removed from the surface of the fractured glass particulates. The air passage up the conduit 51 is sufficiently fast to carry all loose powder up the chute 51 and into the top of the auger where, because it is already entrained in the rapidly moving air, it is withdrawn with the air stream passing through the conduit 111 via off-take conduit 24 into a centrifugal separator 71 and also to some extent via conduits 70 and 69 into the collection chamber 35 where it eventually joins the countercurrent flow of air upwardly through the tortuous passage 68. This countercurrent stream of air, as explained above, joins the concurrent stream of air passing down the chute 19 and through the fracture chamber 23 and is drawn off through the off-take conduit 25.

Two streams of gas or air pass into the initial portion of conduit 25, the one from the top being fairly well saturated with small particulates separated from the fractured glass particulates in the fracture chamber 23 and the one from the bottom issuing from the tortuous passage 68 being much cleaner countercurrent stripping gas. However, the gas stream from tortuous passage 68 also carries, by the time it has traversed passage 68, considerable toxic powder. This toxic dust carrying air passing into the exhaust or off-take conduit 25, located just under the upper baffle 65, joins air passing from conduit 111 and then passes from conduit 25 to a cyclone-type gas separator 71 where a swirling motion is set up in the air stream by the angle of the gas entering from the side. Such swirling motion combined with the increase in the volume of the passage, as generally known to those skilled in the art, causes the upper range of the small particulates entrained in the gas to move outwardly in the gas stream and to separate from the gas stream against the side of the cyclone apparatus and fall along the side wall to the bottom of the cyclone separator where the particulates can be periodically allowed to pass by gravity from the bottom of the cyclone into any suitable receptacle, not shown.

The gas from which the particulates have separated largely by having been thrown against the sides of the cyclone chamber 73 by the spiraling action of the gas, meanwhile fills the center of the chamber and wells or passes upwardly from the chamber through a central dependent conduit 75, the shape of the outer surfaces of which serves initially also to aid in initiating the swirling motion of the gas passing into the cyclone device. The upwelling gas passes through the conduit 75 into an upper chamber 77 from which it is exhausted through a further conduit 79 into the lower portion of a bag-house-type filter 81 where the air stream is filtered by conventional periodically vibrated filter bags 83. The filter bags effect a good separation between the air and toxic powder entrained in the air. The filter air is collected in the top of the bag-house-type filter 81 into the chamber 85 from whence it is discharged via conduit 87 to the top of a filter chamber 89. Within the top of the filter chamber 89 there is preferably a high efficiency HEPA-type filter 93 for removing very fine particulates from the air stream. The HEPA filter 93 is provided with an outlet 95 which leads from the filter chamber 89 to the suction fan 27 previously identified. This fan 27 is operated or rotated by a motor 97 and exhausts from an outlet 99 which opens into the approximate center of the activated carbon or charcoal filter 29 previously identified.

The activated carbon or charcoal filter 29 is shown formed of a central chamber 101 within the center of a series of flat activated carbon panels 103 usually two or more inches thick. Each panel is preferably formed of two separate panels a short distance apart designated 103A and 103B. The panels are fitted together so that an essentially gas tight chamber is formed having a fairly large central opening and outer walls formed of double carbon panels through which gas entering the central chamber and spreading out through the chamber slowly passes while metallic vapors such as mercury vapor in the gas are absorbed into the activated carbon. The large volume of the central chamber 101 and the large area of the activated carbon panels 103 surrounding the central chamber ensure that the gas velocity is slowed down sufficiently to allow sufficient retention time in the activated carbon panels 103 to absorb the metallic vapors in or upon the chemically coated activated carbon or charcoal. After the carbon panels are partially saturated with metallic vapor, the panels 32 are changed to renew the absorption capacity of the carbon filter panels.

It has been found that when the fracture blade of the invention as shown in FIGS. 4, 6 and 7 is used with the fracture and separation apparatus shown in FIG. 8 that a very superior separation of glass particulates and potentially toxic phosphor and other powders is obtained. The more uniform fractured glass sizes and absence of any great amount of very small glass particles enables a very clean separation to be effected.

Furthermore, when the blade of the invention is operated at the speed of the invention, i.e. within the range of 1760 to 3700 feet per minute tip speed, or striking tip speed, it has been found that a very superior fractured glass mix is produced upon which a particularly effective separation of the toxic phosphor particles and glass particulates can be effected. Operation over this tip speed tends to produce glass particulates having an average size which is undesirably small and operation below such speed tends to produce an average size of glass particulates which is undesirably large.

It should be understood that although the present invention has been described at some length and in considerable detail and with some particularity with regard to several embodiments in connection with the accompanying figures and description, all such description and showing is to be considered to be illustrative only and the invention is not intended to be narrowly interpreted in connection therewith or limited to any such particulars or embodiments, but should be interpreted broadly within the scope of the delineation of the invention set forth in the accompanying claims thereby to effectively encompass the intended scope of the invention.

I claim:

1. A method of digesting fluorescent light tubes including breaking such light bulbs into more uniform sized fractured glass particulates, comprising:
   (a) progressively feeding fluorescent light tubes into the striking arc of a rotating-fracture blade means,
   (b) striking the fluorescent light tubes rapidly with repeated blows from at least one moving fracture blade extending outwardly from a central supporting hub portion including:
      (i) striking the front and back of said fluorescent light tubes with a forwardly extending substantially sharpened contact point means, designed and constructed to strike a fluorescent tube consecutively upon the front and back of the tube, as the tube is fed into the path of the fracture blade,
      (ii) striking the sides of said fluorescent light tubes with a pair of substantially blunt blade means positioned on each side of the contact point means and designed and constructed to strike the sides of the fluorescent tube,
   (c) wherein the sharpened contact point means strikes the front of the fluorescent tube prior to the blunt blade means striking the sides of the tube and strikes the back of the tube subsequent to the blunt blade means striking the sides of the fluorescent tube with its surface.

2. A method of digesting fluorescent light tubes in accordance with claim 1 wherein the moving fracture blade means is rotated at a predetermined speed within a tube fracture chamber.

3. A method of digesting fluorescent light tubes in accordance with claim 2 wherein the sharpened contact point means and blunt blade means are rotated about the axis of the fracture blade at circumferential velocity of approximately 1760 to 3700 feet per minute.

4. A method of digesting fluorescent light tubes in accordance with claim 3 wherein the circumferential velocity of the sharpened contact point means and blunt blade means is 2400 to 3050 feet per minute.

5. A method of digesting fluorescent light tubes in accordance with claim 3 wherein the circumferential velocity of the sharpened contact point means and blunt blade means is 2650 to 2800 feet per minute.

6. A method of digesting fluorescent light tubes in accordance with claim 2 wherein after the fluorescent light tube is struck by the rotating fracture blades, fractured glass particulates are subjected to further treatment steps to separate potentially toxic powder from the surface of the fractured glass particulates.

7. A method of digesting fluorescent light tubes in accordance with claim 6 wherein fractured glass particulates derived from striking by the contact point means and blunt blade means are thereafter subjected to a countercurrent gas stripping operation to remove potentially toxic powder particulates from the surfaces of said fractured glass particulates and carry such powder away entrained in said gas to a subsequent apparatus adapted for removing small particles from a gas stream.

8. A method of digesting fluorescent light tubes in accordance with claim 7 wherein the fractured glass particulates are gravity impacted upon a plurality of downwardly slanted baffles to dislodge additional potentially toxic phosphor powder from the surface of said fractured glass particulates during at least a portion of said countercurrent stripping operation.

9. A method of digesting fluorescent light tubes in accordance with claim 8 wherein the fractured glass particulates are further subjected to a dynamic churning operation in which the particulates are actively moved past each other in surface to surface contact to at least lightly abrade potentially toxic powder from the surfaces of the particulates and subsequently air stripping said powder from the fractured glass particulates in connection with said dynamic churning action.

10. A method of digesting fluorescent light tubes in accordance with claim 9 wherein the gas stripping in connection with said dynamic churning is effected simultaneously with said dynamic churning step.

11. A method of digesting fluorescent light tubes in accordance with claim 9 wherein the gas stripping in connection with said dynamic churning is effected subsequent to said dynamic churning.

12. A method of increasing the uniformity of sizing of fractured glass particulates derived from used fluorescent light tubes comprising:
   (a) striking the center of the tube with a sharp instrumentality,
   (b) striking the sides of the tube immediately after striking the center with a blunt instrumentality in the same direction as the striking movement of the sharp instrumentality, and
   (c) striking the rear of the tube with said sharp instrumentality immediately after striking the sides of the tube.

13. A method of increasing the uniformity of the sizing of fractured glass particulates in accordance with claim 12 while additionally increasing the separation of the fractured glass particulates from potentially toxic powder particles adhered to the glass particulates comprising:
   (c) striking the used fluorescent tube with the sharp and blunt instrumentalities at an arcuate rotational speed of approximately 1760 to 3700 feet per minute.

14. A method in accordance with claim 13 wherein the fractured glass particulates are, subsequent to striking with the sharp and blunt instrumentalities, subjected to countercurrent stripping with a rapidly moving stripping gas to remove potentially toxic powders dislodged from the surface of said glass particulates.

15. A method in accordance with claim 13 wherein the arcuate rotational striking speed is 2400 to 3050 feet per minute.

16. A method in accordance with claim 15 wherein the arcuate rotational striking speed is 2650 to 2800 feet per minute.

17. A method in accordance with claim 11 wherein the fractured glass particulates are, subsequent to striking with the sharp and blunt instrumentalities, subjected to countercurrent stripping with a rapidly flowing stripping gas to remove the potentially toxic powder particles.

18. A fracture blade for fracturing fluorescent light tubes comprising:
   (a) a central fracture blade rotor means,
   (b) at least two flat blades secured to such rotor means in a generally radially and transversely extended orientation with respect to rotation of said fracture blade, each flat blade being designed and arranged to have a striking surface on its forwardly moving surface for striking a fluorescent light tube thrust within its arc of movement,
   (c) forwardly projecting pointed striking blades attached to a central upper portion of the striking surface of the radially and transversely oriented flat blades,
   (d) said forwardly projecting blades having bases attached to the transverse blades and tapering to an outer striking point.

19. A rotatable fracture blade in accordance with claim 18 wherein outer margins of the radially and transversely oriented flat blades are hard faced for wear resistance against glass.

20. A fracture blade apparatus for fracturing fluorescent light tubes into substantially similar sized glass fragments comprising:
   (a) a central rotatable hub,
   (b) a feeding means for feeding fluorescent light tubes into a position adjacent said hub,
   (c) at least one first striking blade having a generally pointed fluorescent tube impact surface, said striking blade being secured to said hub and arranged to describe an arc about the hub as the hub rotates with the direction in which the generally pointed fluorescent tube impact surface of the striking blade moves maintained substantially tangent to the arc described by the first striking blade about the hub, and
   (d) at least two second striking blades having substantially planar impact surfaces extending on either side of the first striking blade with their substantially planar impact surfaces oriented substantially at right angles to the tangent to the arc described by the first striking blade.

21. A fracture blade apparatus in accordance with claim 20 wherein the at least two second striking blades extend radially from the rotatable hub.

22. A fracture blade apparatus in accordance with claim 21 wherein the two second striking blades are integrally connected.

23. A fracture blade apparatus in accordance with claim 22 wherein the first striking blade extends outwardly from the surface of the two second integrally connected striking blades.

24. A rotatable fracture blade for fracturing tubular vitreous objects comprising,
   (a) a central rotatable supporting hub portion,
   (b) at least one striking blade assembly having three discrete striking surfaces extending outwardly from the hub portion for impacting discrete portions of tubular vitreous objects, said striking blade assembly being comprised of,
      (i) a first forwardly extending substantially sharpened contact point means forming a restricted diameter striking surface arranged and constructed to strike said tubular vitreous objects on the outer circumference of the tubular objects at the front and the back as said tubular object is fed lengthwise into the moving rotational circumference of the blade,
      (ii) a second pair of substantially blunt blade means incorporating laterally extended striking surfaces positioned on either side of said restricted diameter striking surface arranged and constructed to rotate in coordination with their striking surfaces facing in the same direction as said restricted diameter striking surface in order to strike the sides of a vitreous tubular object substantially transversely of said restricted diameter striking surface subsequent to impingement of the restricted diameter striking surface of the first contact point means with the front of said tubular vitreous object and prior to impingement of the restricted diameter striking surface of the first contact point means with the rear of said tubular vitreous object.

25. A rotatable fracture blade in accordance with claim 24 wherein the second pair of substantially blunt blade means extend radially from the supporting hub.

26. A rotatable fracture blade in accordance with claim 24 wherein the second pair of substantially blunt blade means extend substantially laterally at right angles from the base of the first sharpened contact point means.

27. A rotatable fracture blade in accordance with claim 24 wherein the second pair of substantially blunt blade striking surface means comprise the sides of a unitary blade arranged substantially transverse to the rotational movement of the fracture blade as a whole and the first forwardly extending substantially sharpened contact point means comprises a central striking blade attached to the center of the central portion of the substantially transverse unitary blade.

28. A rotatable fracture blade in accordance with claim 27 additionally comprising:
   (c) hard facing material upon outer margins of the transverse blade to decrease wear of such blade.

29. A rotatable fracture blade in accordance with claim 27 wherein outer margins of the transverse blade are formed from a material having a substantially increased wear resistance with respect to the remainder of the fracture blade.

30. A rotatable fracture blade in accordance with claim 27 wherein the substantially transverse blade is an essentially flat blade and the central striking blade extends transversely from the outer central portion of said flat blade.

31. A rotatable fracture blade in accordance with claim 30 wherein there are at least two transverse blades upon the central hub portion.

32. A rotatable fracture blade in accordance with claim 31 wherein the transverse blades are secured to a central cylindrical rotor.

* * * * *